(12) United States Patent
Eoh et al.

(10) Patent No.: US 8,670,518 B2
(45) Date of Patent: Mar. 11, 2014

(54) FULLY PASSIVE DECAY HEAT REMOVAL SYSTEM FOR SODIUM-COOLED FAST REACTORS THAT UTILIZES PARTIALLY IMMERSED DECAY HEAT EXCHANGER

(75) Inventors: Jae-Hyuk Eoh, Daejeon (KR); Tae-Ho Lee, Daejeon (KR); Ji-Woong Han, Seoul (KR); Seong-O Kim, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 702 days.

(21) Appl. No.: 12/572,851

(22) Filed: Oct. 2, 2009

(65) Prior Publication Data
US 2010/0177860 A1    Jul. 15, 2010

(30) Foreign Application Priority Data

Jan. 14, 2009    (KR) .................. 10-2009-0002904

(51) Int. Cl.
*G21C 9/00*    (2006.01)
*G21C 15/18*    (2006.01)
*G21C 15/00*    (2006.01)

(52) U.S. Cl.
USPC ........... 376/299; 376/277; 376/287; 376/289; 376/290; 376/298

(58) Field of Classification Search
USPC ......... 376/289, 299, 277, 287, 290, 293, 298, 376/347, 361, 402–405
See application file for complete search history.

(56) References Cited

U.S. PATENT DOCUMENTS

| | | | | |
|---|---|---|---|---|
| 4,324,617 A | * | 4/1982 | Sowers et al. | 376/405 |
| 4,592,888 A | * | 6/1986 | Cornu et al. | 376/299 |
| 4,767,594 A | * | 8/1988 | Hunsbedt | 376/299 |
| 4,780,270 A | * | 10/1988 | Hundal et al. | 376/299 |
| 5,021,211 A | * | 6/1991 | Hunsbedt et al. | 376/299 |
| 5,158,742 A | * | 10/1992 | Dillmann | 376/299 |

(Continued)

FOREIGN PATENT DOCUMENTS

JP    03277994 A    * 12/1991

OTHER PUBLICATIONS

J.C. Lefevre et al., European fast reactor design, Nuclear Engineering and Design 162 (1996) 133-143.

(Continued)

*Primary Examiner* — Bernarr Gregory
(74) *Attorney, Agent, or Firm* — Bachman & LaPointe, P.C.

(57) ABSTRACT

Disclosed herein is a fully passive decay heat removal system utilizing a partially immersed heat exchanger, the system comprising: a hot pool; an intermediate heat exchanger which heat-exchanges with the sodium of the hot pool; a cold pool; a support barrel extending vertically through the boundary between the hot pool and the cold pool; a sodium-sodium decay heat exchanger received in the support barrel; a sodium-air heat exchanger provided at a position higher than the sodium-sodium decay heat exchanger; an intermediate sodium loop connecting the sodium-sodium decay heat exchanger with the sodium-air heat exchanger; and a primary pump, wherein a portion of the effective heat transfer tube of the sodium-sodium decay heat exchanger is immersed in the cold pool, particularly in a normal operating state, and the surface of the lower end of a shroud for the sodium-sodium decay heat exchanger, the lower end being immersed in the sodium of the cold pool, has perforated holes.

11 Claims, 12 Drawing Sheets

(56) References Cited

U.S. PATENT DOCUMENTS

| | | | | |
|---|---|---|---|---|
| 5,263,070 | A * | 11/1993 | Kumaoka | 376/406 |
| 7,308,070 | B2 * | 12/2007 | Sim et al. | 376/299 |
| 7,522,693 | B2 * | 4/2009 | Eoh et al. | 376/299 |
| 7,526,057 | B2 * | 4/2009 | Sim et al. | 376/299 |
| 8,300,759 | B2 * | 10/2012 | Jeong et al. | 376/299 |

OTHER PUBLICATIONS

B. Farrar et al., Fast reactor decay heat removal: approach to the safety system design in Japan and Europe, Nuclear Engineering and Design 193 (1999) 45-54.

H. Stehle et al., Large scale experiments with a 5 MW sodium/air heat exchanger for decay heat removal, Nuclear Engineering and Design 146 (1994) 383-390.

S.C. Chetal et al., The design of the Prototype Fast Breeder Reactor, Nuclear Engineering and Design 236 (2006) 852-860.

A. John Arul et al., Reliability analysis of safety grade decay heat removal system of Indian prototype fast breeder reactor, Annals of Nuclear Energy 33 (2006) 180-188.

T. Sajith Mathews et al., Functional reliability analysis of Safety Grade Decay Heat Removal System of Indian 500 MWe PFBR, Nuclear Engineering and Design 238 (2008) 2369-2376.

K. Revathy et al., Transient Analysis of Single-Phase Natural Circulation in SADHANA loop, Proceedings of ICAPP '09, Tokyo, Japan, May 10-14, 2009, Paper 9215.

Jae-Hyuk Eoh et al., Design features of the passive decay heat removal system of KALIMER-600, Transactions of the Korean Nuclear Society Spring Meeting, Jeju, Korea, May 22, 2009.

Jae-Hyuk Eoh et al., Feasibility study on the design options to prevent the PDRC loop sodium freezing in KALIMER-600.

Tae-Ho Lee et al., Development of Passive Decay Heat Removal System PDRC.

Jae-Hyuk Eoh et al., Transient Performance Analysis of the passive DHR System in KALIMER-600.

* cited by examiner

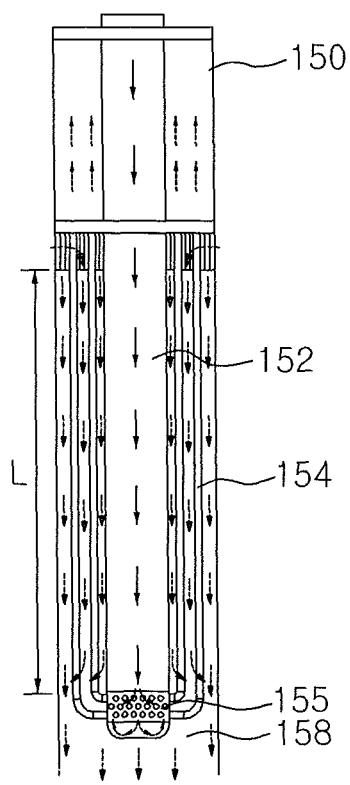

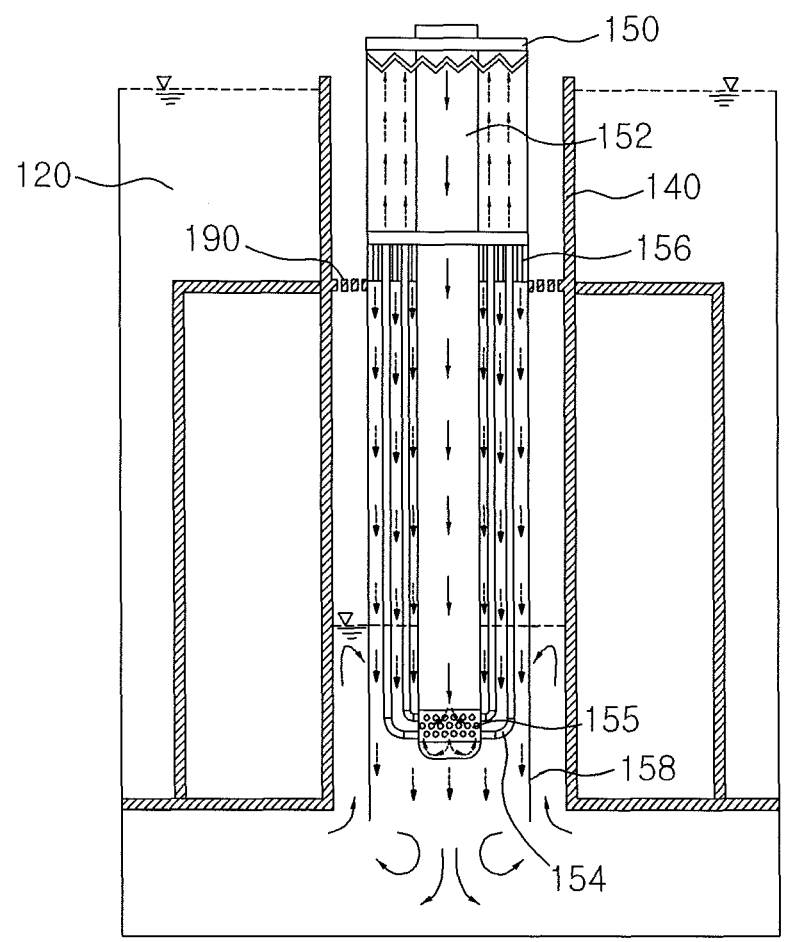

FULLY PASSIVE DECAY HEAT REMOVAL SYSTEM FOR SODIUM-COOLED FAST REACTORS THAT UTILIZES PARTIALLY IMMERSED DECAY HEAT EXCHANGER

CROSS-REFERENCES TO RELATED APPLICATION

This patent application claims the benefit of priority under 35 U.S.C. §119 from Korean Patent Application No. 10-2009-002904 filed on Jan. 14, 2009, the contents of which are incorporated herein by reference.

BACKGROUND OF THE INVENTION

1. Field of the Invention

The present invention relates to a fully passive decay heat removal system utilizing a partially immersed heat exchanger, the system comprising: a hot pool having received therein hot sodium heated by a nuclear reactor core; an intermediate heat exchanger which heat-exchanges with the sodium of the hot pool; a cold pool having received therein cold sodium cooled by passage through the intermediate heat exchanger, the cold pool being isolated from the hot pool; a support barrel extending vertically through the boundary between the hot pool and the cold pool, in which the upper end of the support barrel is higher than the liquid level of the hot pool, and the lower end thereof penetrates into the cold pool; a sodium-sodium decay heat exchanger received in the support barrel in order to remove decay heat from the inside of the nuclear reactor; a sodium-air heat exchanger which is provided at a position higher than the sodium-sodium decay heat exchanger; an intermediate sodium loop for heat removal which connects the sodium-sodium decay heat exchanger with the sodium-air heat exchanger; and a primary pump which pumps the sodium of the cold pool to the hot pool via the nuclear reactor core in a normal operating state to maintain the liquid level difference between the hot pool and the cold pool, such that the liquid level of the hot pool is higher than that of the cold pool, wherein a portion of the effective heat transfer tube of the sodium-sodium decay heat exchanger is immersed in the cold pool, particularly in a normal operating state, and the surface of the lower end of a shroud for the sodium-sodium decay heat exchanger, the lower end being immersed in the sodium of the cold pool, has perforated holes.

2. Description of the Prior Art

Sodium-cooled fast reactors which are currently developed are provided with a safety grade decay heat removal system to remove decay heat produced in the reactor core due to emergency reactor shutdown when the normal heat removal paths, which are connected to the reactor core, an intermediate heat exchanger (IHX) and a steam generator (SG), are lost.

Till now, in a variety of liquid-metal-cooled fast reactors (hereinafter referred to as "liquid-metal reactors"), including sodium-cooled fast reactors, a passive safety-grade decay heat removal system has been used to enhance safety. For example, a decay heat removal system for a pool-type liquid-metal reactor is designed such that the heat of the system can be effectively removed by natural coolant circulation using the thermal inertia of a hot pool disposed above the reactor core outlet.

In the case of a conventional large-scale pool-type nuclear reactor, as shown in FIG. 1, a fully immersed-type decay heat exchanger (DHX) 3 through which the sodium of an intermediate sodium loop 2 for heat removal flows is installed in a hot pool 1 filled with the sodium of the primary circuit, and a sodium-air heat exchanger (AHX) 4 is installed at the upper portion of the nuclear reactor building. Thus, through a density difference resulting from a height difference of more than 20 m formed between the source to which heat is transferred (i.e., DHX) and the source from which heat is removed (i.e., AHX), sodium for heat removal naturally circulates in the intermediate sodium loop 2 for heat removal, which is separately provided, and the heat of the primary circuit is removed by the air which is the ultimate heat sink. This method is called "direct reactor cooling" (DRC).

However, in the design concept of such direct reactor cooling, the heat exchange between the hot pool 1 and the sodium-air heat exchanger occurs continuously even during normal operation. Thus, in order to prevent heat loss during normal operation, the flow rate of air into the sodium-air heat exchanger 4 is controlled by installing a separate isolation valve 5 in the intermediate sodium loop 2 or installing a damper 6 in an inlet/outlet pipe for the air, so that solidification of the intermediate sodium loop 2 for heat removal is prevented and the amount of heat loss during normal operation is controlled. Accordingly, although the intermediate sodium loop 2 for heat removal performs the heat removal function by natural coolant circulation, a starting signal for operating the system is produced either by the intervention of an operator or by a trip signal, and thus the system is designed such that active devices provided with a deriving unit such as the damper 6 or the isolation valve 5 are operated. For this reason, strictly speaking, the system shown in FIG. 1 is barely classifiable as a fully passive system.

To overcome the incompleteness of this passive system, another prior art shown in FIG. 2 utilizes a fully passive decay heat removal system for a pool-type liquid-metal reactor. In such a fully passive decay heat removal system, a sodium-sodium decay heat exchanger (DHX) support barrel 12 made of a vertical cylindrical tube, which communicates a hot pool 10 with a cold pool 11, is disposed in the reactor pool area, and a sodium-sodium decay heat exchanger 13 is disposed on the free surface of the cold pool using the liquid level difference between the hot pool 10 and the cold pool, which is maintained by the head of a primary pump (not shown), such that it does not make direct contact with the sodium.

Thus, the system shown in FIG. 2 is designed such that direct contact between the sodium-sodium decay heat exchanger 13 and the sodium of the cold pool 11 during normal operation can be fundamentally prevented, so that unnecessary heat loss during normal operation can be minimized without requiring the use of either an isolation valve in an intermediate sodium loop 15 for heat removal or a damper in the air inlet/outlet of a sodium-air heat exchanger 14.

Particularly, such a design concept adopts the concept in which the decay heat of the system is dispersed into the ultimate heat sink (atmosphere) by a vigorous convection heat transfer between the sodium of the primary loop and the intermediate sodium loop 15 for heat removal, only when the sodium liquid level rises due to a shutdown of the nuclear reactor and the primary pump resulting from loss of the normal heat removal paths. Thus, this design concept makes it possible to realize a passive decay heat removal system for large-scale nuclear reactors, which adopts a fully passive concept and can improve operational reliability.

However, the prior art shown in FIG. 2 does not utilize an air flow control device such as a damper in the sodium-air heat exchanger 14 to realize the fully passive concept. Thus, during the winter season when the temperature of outdoor air falls below zero or during the refueling operation when the temperature of the nuclear reactor pool sodium falls to 200° C. (for reference, the average temperature of the sodium of the nuclear reactor pool is 467° C.), there is a possibility for the sodium of the intermediate sodium loop to be solidified or frozen. The melting point of sodium is about 98° C., and thus when an outdoor air temperature of −40° C. which is adopted as the design standard is introduced into the air inlet of the sodium-air heat exchanger 14, there is a high possibility for the sodium in the sodium heat transfer tube of the sodium-air heat exchanger 14 to be solidified. In this prior art, if solidification occurs in the intermediate sodium loop 15, particularly the sodium heat transfer tube of the sodium-air heat exchanger 14, the paths for removing decay heat by natural circulation from the nuclear reactor pool into the atmosphere will be closed, so that the safety of the nuclear power plant will be seriously deteriorated. Accordingly, a method capable of preventing the sodium of the intermediate sodium loop from solidifying during the entire operating period of a nuclear power plant, including the operational standby period, is necessarily required.

The solidification of sodium in the intermediate sodium loop of the prior passive decay heat removal circuit (PDRC) adopting the fully passive concept and direct reactor cooling occurs for the following reason. The circuit is designed such that heat transfer from the sodium pool of the primary circuit to the sodium of the intermediate sodium loop during normal operation is achieved only by the radiation heat transfer mechanism without direct contact of the sodium, and thus the temperature of sodium in the intermediate sodium loop does not sufficiently rise depending on outdoor air conditions due to the influence of radiation heat transfer resistance which is much higher than convection or conduction heat transfer resistance.

Thus, in order to satisfy the design standard, the supply of heat should be stably secured, such that the solidification of sodium in the intermediate sodium loop is prevented during the entire operating period of the nuclear power plant, including the normal operating mode. However, there are disadvantages in that it is difficult only by radiation heat transfer to supply heat in an amount sufficient for preventing the solidification of sodium in the intermediate sodium loop in the normal operating mode and for forming the fundamental circulation of a coolant in the operational standby mode and in that the operational reliability of the safety system is significantly reduced, because design uncertainty in interpretative methodologies for the surface emissivity and radiation heat transfer of the internal structures of the nuclear reactor is great. Particularly, the prior art shown in FIG. 2 provides neither a method nor equipment, which copes with the case in which the temperature of outdoor air falls below zero, and serves to prevent sodium in the intermediate sodium loop from solidifying at the refueling temperature (200° C.) of a nuclear power plant.

Furthermore, the most urgent problem to be solved in the prior art can be considered to be the operating performance of the fully passive decay heat removal circuit (PDRC) in the case in which the pump of the primary circuit is operated without being shut down after the shutdown of the nuclear reactor. In this case, because the liquid level difference between the hot pool and the cold pool can be maintained by the operation of the pump, the liquid level of the cold pool can rise. For this reason, it is impossible to perform the smooth heat removal function of the fully passive decay heat removal circuit (PDRC), and a serious failure to perform the natural function of the safety system can occur. Accordingly, there is needed a design concept in which a given quantity of heat removal function can be provided even when the liquid level difference between the hot pool and the cold pool is maintained. However, the prior art does not describe a proper method for ensuring operational reliability and stable performance related therewith.

In addition, in the transition stage in which the normal heat removal function is lost so that the safety system is regularly operated, there is a possibility in which an overflow of sodium introduced from the hot pool can be formed into undesirable bypass flow in a ring-shaped space between the sodium-sodium decay heat exchanger (DHX) support barrel and the sodium-sodium decay heat exchanger (DHX) shroud without being introduced into the sodium-sodium decay heat exchanger in the DHX support barrel. In this case, it is expected that the flow of operating fluid which is used for heat removal will decrease, leading to deterioration in the heat removal performance of the sodium-sodium decay heat exchanger. However, the prior art provides neither any method nor improved design concept for a loop structure which can also reduce pressure loss without deteriorating the formation of the primary circulation flow passing through the sodium-sodium decay heat during the transition stage and normal operation.

SUMMARY OF THE INVENTION

It is an object of the present invention to provide a fully passive decay heat removal system for sodium-cooled fast reactors, which has neither a separate isolation valve mounted in an intermediate sodium loop for heat removal nor a damper installed in the air inlet/outlet tube of a sodium-air heat exchanger, and thus can eliminate the possibility of intervention of an operator while fundamentally eliminating all kinds of factors reducing operational reliability, including the possibility of solidification of sodium in the intermediate sodium loop during a period encompassing the entire operating period of a nuclear power plant, and can significantly improve operating performance in a transition stage.

To achieve the above object, the present invention provides a fully passive decay heat removal system utilizing a partially immersed heat exchanger, the system comprising: a hot pool having received therein hot sodium heated by a nuclear reactor core; an intermediate heat exchanger which heat-exchanges with the sodium of the hot pool; a cold pool having received therein cold sodium cooled by passage through the intermediate heat exchanger, the cold pool being isolated from the hot pool; a support barrel extending vertically through the boundary between the hot pool and the cold pool, in which the upper end of the support barrel is higher than the liquid level of the hot pool, and the lower end thereof penetrates into the cold pool; a sodium-sodium decay heat exchanger received in the support barrel in order to remove decay heat from the inside of the nuclear reactor; a sodium-air heat exchanger which is provided at a position higher than the sodium-sodium decay heat exchanger; an intermediate sodium loop for heat removal which connects the sodium-sodium decay heat exchanger with the sodium-air heat exchanger; and a primary pump which pumps the sodium of the cold pool to the hot pool via the nuclear reactor core in a normal operating state to maintain the liquid level difference between the hot pool and the cold pool, such that the liquid level of the hot pool is higher than that of the cold pool, wherein a portion of the effective heat transfer tube of the sodium-sodium decay heat exchanger is immersed in the cold pool, particularly in a normal operating state, and the surface of the lower end of a shroud for the sodium-sodium decay heat exchanger, the lower end being immersed in the sodium of the cold pool, has perforated holes.

In the present invention, the length of the effective heat transfer tube of the sodium-sodium decay heat exchanger, which is immersed in the cold pool, is preferably ⅓ of the total length of the effective heat transfer tube.

Also, the shroud of the sodium-sodium decay heat exchanger may be formed so as to extend beyond the lower end of the sodium-sodium decay heat exchanger, and the extended portion of the shroud may be formed in the form of a baffle cut.

Herein, the lower end of the shroud formed so as to extend beyond the lower end of the sodium-sodium decay heat exchanger is preferably located at the vertically middle portion of a reactor separation plate.

Also, a heat transfer tube distributor connecting a sodium flow downcomer of the sodium-sodium decay heat exchanger with the heat transfer tubes may be formed of a tube sheet of the same outer diameter as that of the sodium flow downcomer.

In addition, a flow guide plate which induces the sodium of the hot pool, which overflows the support barrel upon loss of the normal heat removal function, to a heat transfer tube inlet formed above the shroud of the sodium-sodium decay heat exchanger, may further be provided immediately below the heat transfer tube inlet.

A space through which the sodium of the cold pool, which flows upward in the support barrel upon loss of the normal removal function, can pass is preferably formed between the support barrel and the shroud. In an embodiment of the present invention, the flow guide plate consists of a perforated ring plate which is inserted into a ring-shaped space formed between the support barrel and the shroud.

BRIEF DESCRIPTION OF THE DRAWINGS

The above and other objects, features and advantages of the present invention will be more clearly understood from the following detailed description taken in conjunction with the accompanying drawings, in which:

FIG. 5b is a cross-sectional view showing the structure of a sodium-sodium decay heat exchanger according to the present invention;

FIG. 9a shows the operating state when the normal heat removal function is maintained;

DETAILED DESCRIPTION OF THE INVENTION

Hereinafter, preferred embodiments of the present invention will be described in detail with reference to the accompanying drawings.

Figure 1:
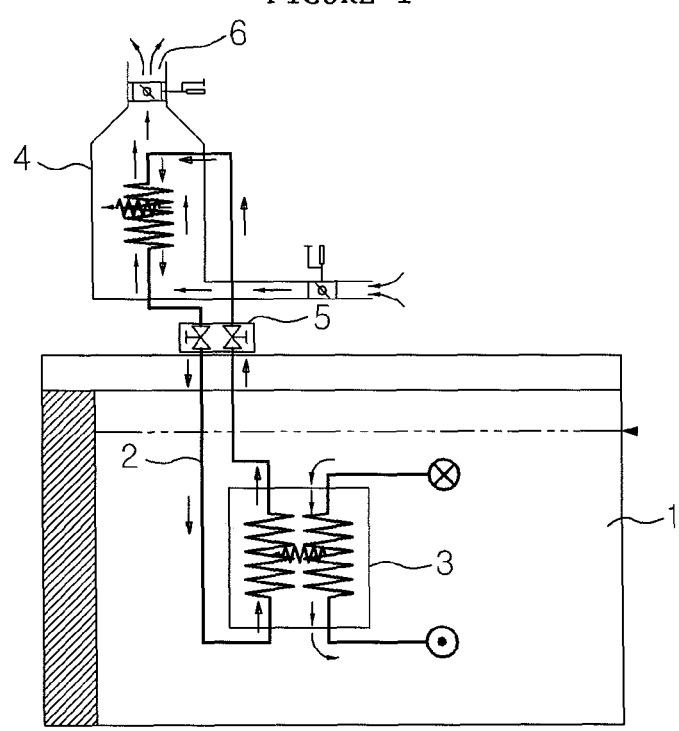
FIG. 1 is a schematic diagram of a decay heat removal system adopting passive direct reactor cooling according to the prior art.
Figure 2:
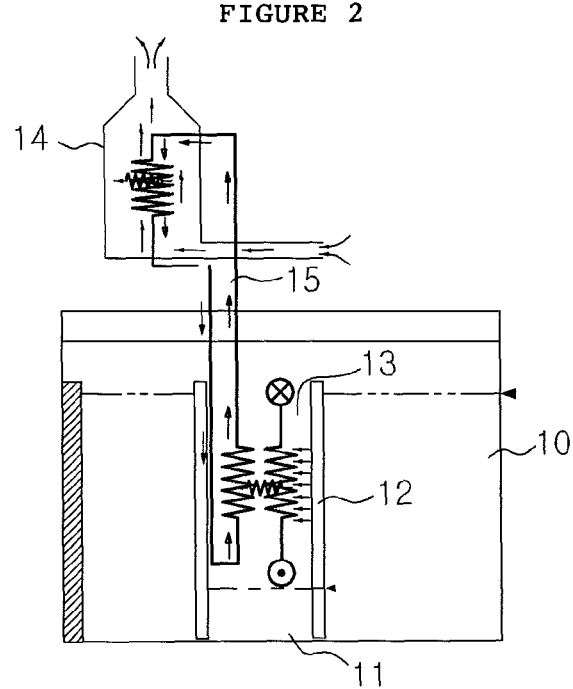
FIG. 2 is a schematic diagram of a decay heat removal system adopting fully passive direct reactor cooling according to the prior art.
Figure 3:
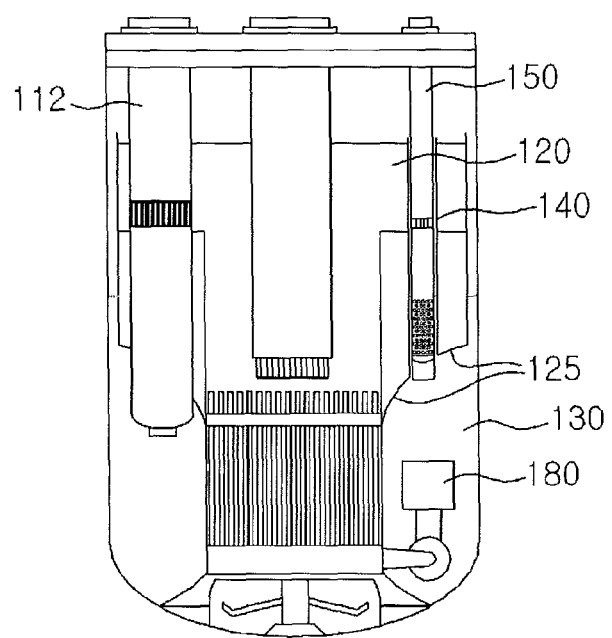
FIG. 3 is a cross-sectional view showing the structure of a sodium-cooled fast reactor having applied thereto a fully passive decay heat removal system according to the present invention.
Figure 4:
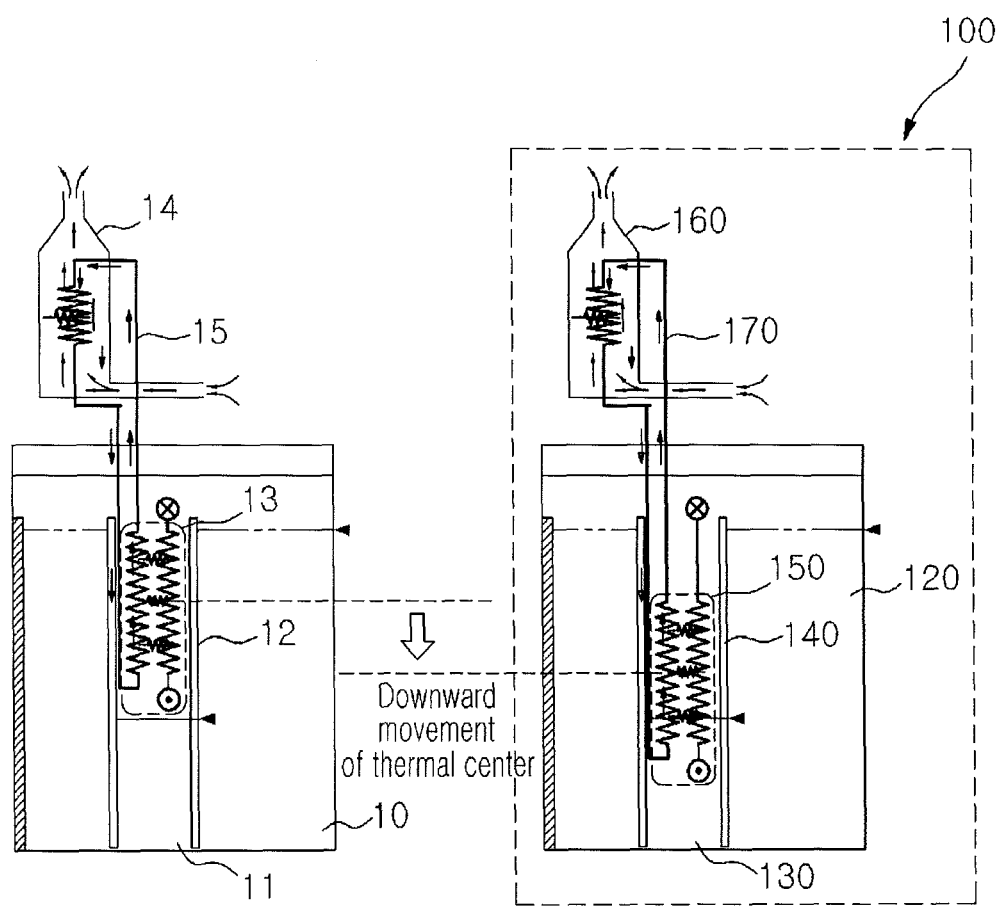
FIG. 4 is a schematic diagram showing the difference in thermal center between the prior art (left) shown in FIG. 2 and the fully passive decay heat removal system according to the present invention (right)

FIG. 3 is a cross-sectional view showing the configuration of a sodium-cooled fast reactor having applied thereto a fully passive decay heat removal system 100 according to the present invention, and FIG. 4 schematically shows the configuration of a fully passive decay heat removal system 100 according to the present invention.

As shown in FIGS. 3 and 4, the fully passive decay heat removal system 100 according to the present invention comprises: a hot pool 120 having received therein hot sodium heated by a nuclear reactor core 110; an intermediate heat exchanger 112 which heat-exchanges with the sodium of the hot pool 120; a cold pool 130 having received therein cold sodium cooled by passage through the intermediate heat exchanger 112, the cold pool being isolated from the hot pool 120; a support barrel 140 extending vertically through the boundary between the hot pool 120 and the cold pool 130, in which the upper end of the support barrel 140 is higher than the liquid level of the hot pool 120, and the lower end thereof penetrates into the cold pool 130; a sodium-sodium decay heat exchanger 150 received in the support barrel 140 in order to remove decay heat from the inside of the nuclear reactor; a sodium-air heat exchanger 160 which is provided at a position higher than the sodium-sodium decay heat exchanger 150; an intermediate sodium loop 170 for heat removal which connects the sodium-sodium decay heat exchanger 150 with the sodium-air heat exchanger 160; and a primary pump 180 which pumps the sodium of the cold pool 130 to the hot pool 120 via the nuclear reactor core 110 in a normal operating state to maintain the liquid level difference between the hot pool 120 and the cold pool 130, such that the liquid level of the hot pool is higher than that of the cold pool 130.

Figure 5A:
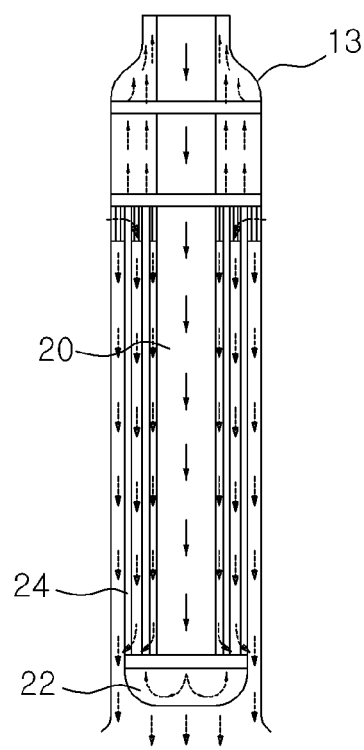
FIG. 5a is a cross-sectional view showing the structure of a sodium-sodium decay heat exchanger according to the prior art shown in FIG. 2.

In particular, the present invention is characterized in that a portion of the effective heat transfer tube length (L) of the sodium-sodium decay heat exchanger 150 is immersed in the sodium of the cold pool 130 in a normal operating state. In the prior art as shown in FIG. 4 and FIG. 5a, the heat transfer tube 24 of the sodium-sodium decay heat exchanger 13 is arranged so as to be completely isolated from the sodium of the cold pool 11, and thus only a small amount of heat resulting from radiation heat transfer is transferred to the intermediate sodium loop 15. Thus, in the present invention, in order to fundamentally improve standby performance including the prevention of sodium solidification in the intermediate sodium loop 170 for heat removal, the thermal center of the sodium-sodium decay heat exchanger 150 is down-regulated as shown in FIG. 4 to optimize the vertical arrangement of the effective heat transfer tube, such that a portion of the effective heat transfer tube makes direct contact with the sodium of the cold pool 130. Accordingly, the amount of heat transfer from the cold pool 130 of the nuclear reactor to the intermediate sodium loop 170 is increased by convection or conduction heat transfer resistance which is much lower than radiation heat transfer resistance.

When the design concept of the partially immersed sodium-sodium decay heat exchanger 150 is applied as described above, a portion of the effective heat transfer tube of the sodium-sodium decay heat exchanger 150 makes direct contact with the sodium of the cold pool 130, while effective heat transfer is performed by the conduction or convection heat transfer mechanism. Particularly in an embodiment of the present invention, the immersed length of the effective heat transfer tube of the sodium-sodium decay heat exchanger 150, which is immersed in the sodium region of the cold pool 130, is ⅓ of the total effective transfer tube length (L). In this case, the thermal center of the sodium-sodium decay heat exchanger 150 moves downward, while the difference in thermal center between the sodium-air heat exchanger 160 and the sodium-sodium decay heat exchanger 150 in the intermediate sodium loop 170 for heat removal is increased by about 0.6 m, whereas the difference in thermal center between the sodium-sodium decay heat exchanger 150 and the reactor core 110 is decreased by about 0.6 m. When transition performance associated with this change in thermal center was analyzed, it was shown that a change in thermal center of less than about 1.0 m did not substantially influence the long-term cooling behavior of the fully passive decay heat removal system.

Meanwhile, when examining the region of the heat transfer tube 154 of the sodium-sodium decay heat exchanger 150 immersed in the sodium region of the cold pool 130 during normal operation, the sodium of the cold pool 130 provided in the lower space of the sodium-sodium decay heat exchanger 150, which is defined radially by the shroud 158 of the sodium-sodium decay heat exchanger 150, can be locally over-cooled, because heat is continuously removed by the heat transfer tube 154 of the sodium-sodium decay heat exchanger 150. Ultimately, a very low sodium temperature can be formed in the streamline direction of sodium flowing in the sodium-sodium decay heat exchanger 150.

Accordingly, in order to prevent local overcooling of sodium in the shroud 158 of the sodium-sodium decay heat exchanger 150 which is immersed in the sodium region of the cold pool 130, the present invention utilizes a partially perforated shroud, obtained by partially perforating a portion of the sodium-sodium decay heat exchanger shroud 158 that corresponds to the immersed length of the heat transfer tube of the sodium-sodium decay heat exchanger 150 which is immersed in the sodium of the cold pool 130 during normal operation.

Accordingly, even during a normal operating period, the non-overcooled sodium of the cold pool 130 provided in the ring-shaped space formed between the inside of the support barrel 140 of the sodium-sodium decay heat exchanger 150 and the shroud 158 of the sodium-sodium decay heat exchanger 150 can be smoothly circulated to the region of the cold pool 130, after it passes through the perforated shroud 158 and makes contact with the heat transfer tube 154 inside the shroud 158 of the sodium-sodium decay heat exchanger 150 which is immersed in the sodium. Herein, only a portion of the shroud 158 which is immersed in the sodium region of the cold pool 130 is preferably perforated without most of the surface of the shroud 158 being perforated, such that a portion of the sodium flow of the hot pool 120 which overflows the sodium-sodium decay heat exchanger 140 in a transition stage is unnecessarily lost, whereby the heat exchange performance of the sodium-sodium decay heat exchanger 150 is not deteriorated.

According to the present invention, because the partially immersed sodium-sodium decay heat exchanger 150 is used, the configuration of the heat transfer tube 154 of the sodium-sodium decay heat exchanger 150 is improved as shown in FIG. 5b in order to prevent the above-described local overcooling of sodium.

Specifically, the prior-art heat transfer tube 24 shown in FIG. 5a has a configuration in which a hemispherical chamber 22 is coupled to the lower end of a sodium flow downcomer 20 of a sodium-sodium decay heat exchanger 13 and in which heat transfer tubes 24 are connected to the chamber 22. For this reason, in the prior art, the flow path of the ring-shaped space formed between the inside of the support barrel of the sodium-sodium decay heat exchanger 13 and the shroud of the sodium-sodium decay heat exchanger 13 is significantly interfered with by the hemispherical chamber 22.

In comparison with this, in the sodium-sodium decay heat exchanger 150 according to the present invention, the sodium chamber at the lower end of the heat transfer tubes 154 is altered to be a tube sheet-type heat transfer tube distributor 155 for the distribution/connection of the heat transfer tubes, such that sodium can be discharged directly into the space of the cold pool 130 without infiltrating the flow path of the ring-shaped space. Accordingly, process loss caused by the decrease in flow area is minimized, and the overcooling of sodium at the lower portion of the sodium-sodium decay heat exchanger 150, and the local solidification of sodium are fundamentally prevented from occurring due to the stagnation of the flow of sodium. This improvement in the structure of the heat transfer tube distributor 155 can reduce stress caused by thermal expansion or the like compared to the existing hemispherical chamber 22, and thus is considered to be more appropriate for the design of the heat transfer tubes 154 of the sodium-sodium decay heat exchanger 150 in which the change in temperature is relatively severe compared to devices (e.g., the intermediate heat exchanger 112) which are used during normal operation.

Figure 6:
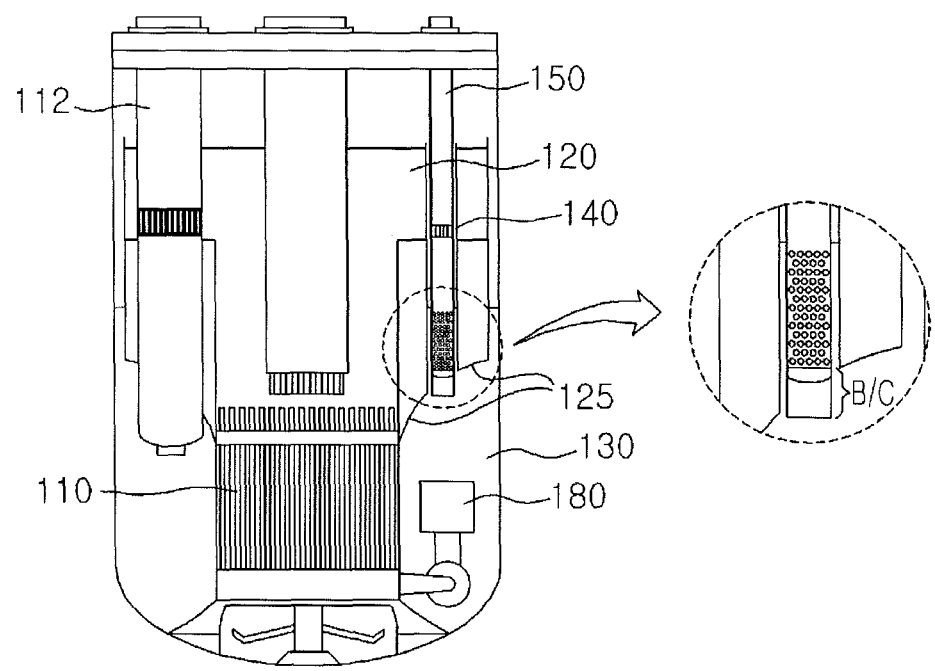
FIG. 6 shows an embodiment of a partially perforated shroud in the present sodium-cooled fast reactor as shown in FIG. 3.

Also, as shown in FIG. 6, the lower portion of the shroud 158 of the sodium-sodium decay heat exchanger can be manufactured in a long cylindrical form without being cut at the lower end of the heat transfer tubes 154, such that it can be provided in the form of a baffle cut corresponding to a kind of flow baffle (see a portion indicated by "B/C" in FIG. 6). Accordingly, the hot sodium flowing toward the sodium-sodium decay heat exchanger 150 by an overflow from the region of the hot pool 120 in a transition stage can be smoothly discharged into the sodium region of the cold pool 130, after it passes through the entire region of the heat transfer tubes. In an embodiment of the present invention, the baffle cut portion at the lower portion of the shroud 158 whose surface is not perforated is configured such that it extends from the portion just below the tube sheet-type heat transfer tube distributor 155 to the middle portion of a reactor separation plate 125 which is the region of the cold pool 130.

Particularly, in the present invention, the sodium flow downcomer 152 of the sodium-sodium decay heat exchanger 150 and the heat transfer tube distributor 155 are provided in a tube sheet form, such that the flow resistance of sodium can be minimized. Thus, if the length of the extended portion of the shroud 158 connected integrally to the lower end of the sodium-sodium decay heat exchanger 150 is designed such that it is sufficiently long within the range that does not impair the general arrangement of internal structures of the nuclear reactor and the sodium flow of the cold pool 130 (for example, if it is designed such that the lower end of the shroud 158 is located at the middle portion of the reactor baffle), a sufficient density difference for the local circulatory flow of a coolant in the sodium-sodium decay heat exchanger shroud 140, which leads to "cold pool-DHX inlet-DHX heat transfer tube region-DHX outlet region-cold pool" can be provided, thus making it possible to secure proper heat transfer performance.

Figure 7:
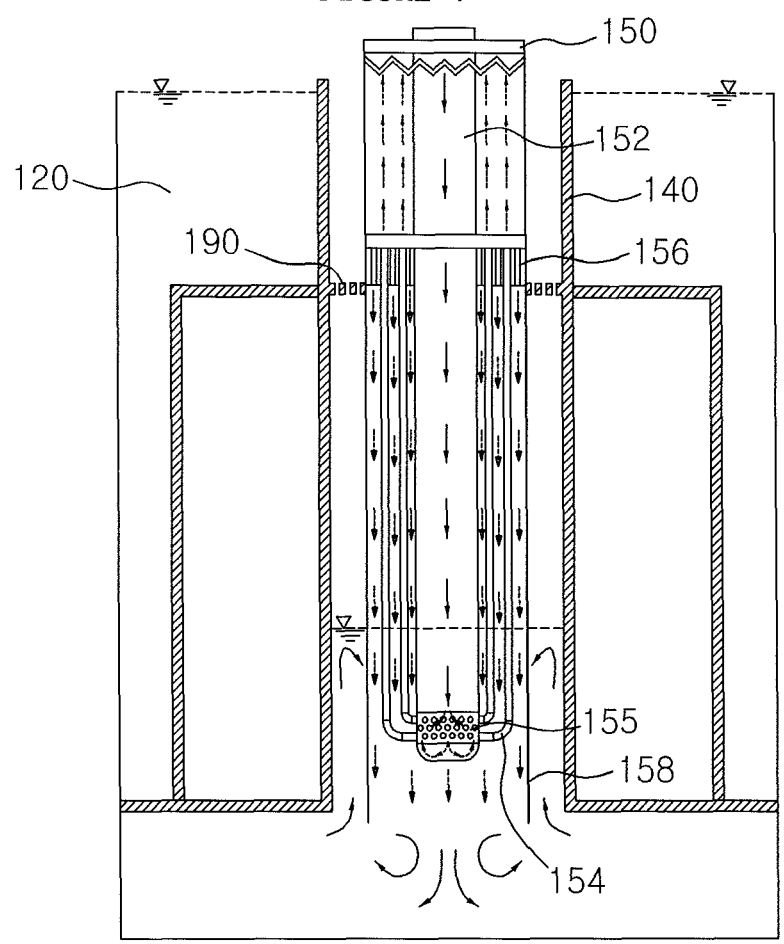
FIG. 7 shows the arrangement of a sodium-sodium decay heat exchanger according to the present invention in a sodium-cooled fast reactor.
Figure 8:
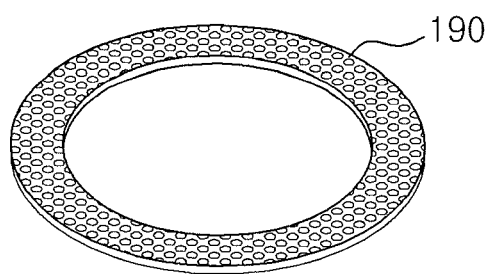
FIG. 8 is a perspective view showing an embodiment of a flow guide plate which is used in the present invention.

In addition, the fully passive decay heat removal system of the present invention may further comprise a flow guide plate 190 which induces sodium overflowing from the hot pool 120 to smoothly flow into the heat transfer tube inlet 156 of the sodium-sodium decay heat exchanger 150, such that the formation of the circulating flow of sodium can be smoothly achieved in a transition stage in the event of loss of the normal heat removal function (see FIG. 7). Herein, as shown in FIG. 8, the flow guide plate 190 which is disposed immediately below the heat transfer tube inlet 156 of the sodium-sodium decay heat exchanger 150 can be designed as a perforated ring plate which is inserted into the ring-shaped space formed between the support barrel 140 and the shroud 158. Accordingly, the sodium of the cold pool 130, which flows upward in the sodium-sodium decay heat exchanger support barrel 140 when the primary pump 180 of the nuclear reactor is shut down, smoothly rises to the vicinity of the liquid level of the hot pool 120 through the flow guide plate 190, such that it dose not impair the formation of overflow. The configuration of the flow guide plate 190 may have, in addition to the perforated ring plate shown in FIG. 8, other configurations in which the space through which the sodium of the cold pool 130 flowing upward in the support barrel can pass is formed between the support barrel 140 and the shroud 158. For example, it is also possible to use a flow guide plate 190 consisting of a plurality of plates connecting the support barrel 140 with the shroud 158, just like umbrella spokes.

Figure 9B:
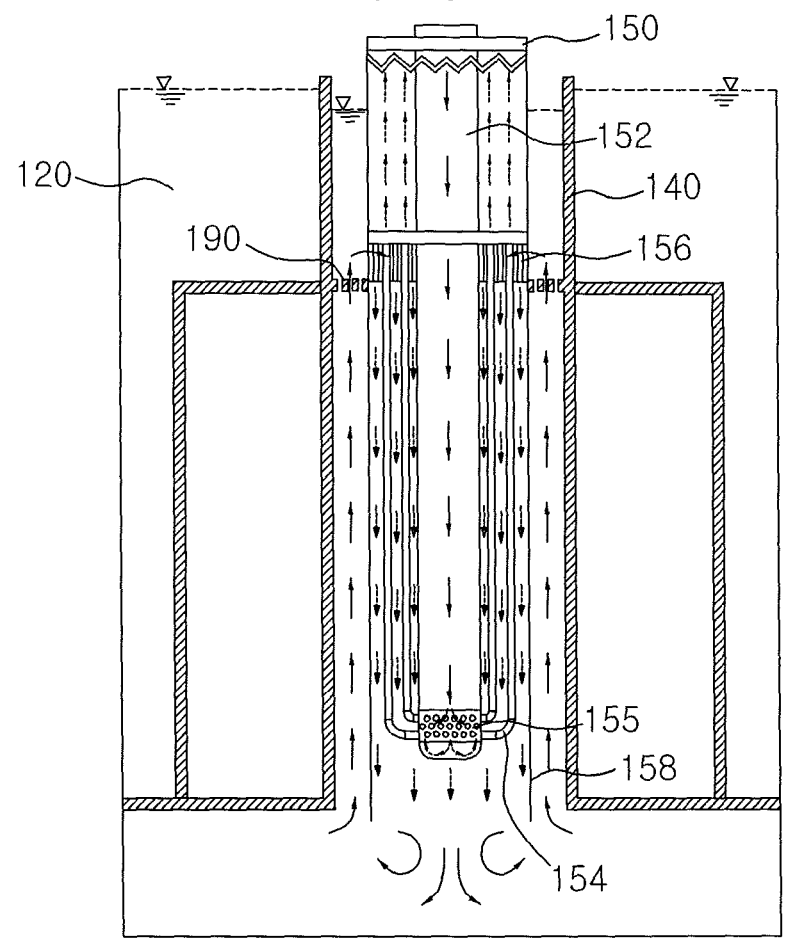
FIG. 9b shows the operating state before the overflow of a hot pool occurs in a transition stage in the event of loss of the normal heat removal function.
Figure 9C:
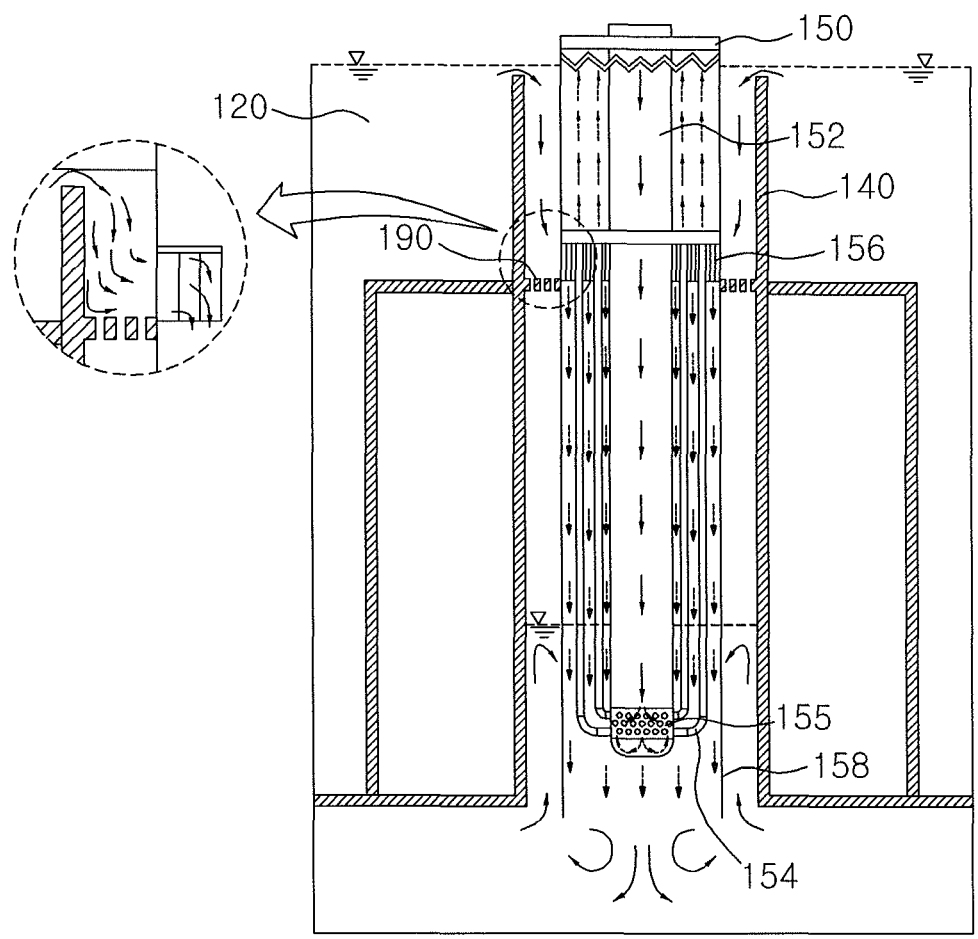
FIG. 9c shows the operating state after the overflow of a hot pool occurs in a transition stage in the event of loss of the normal heat removal function.

FIGS. 9a to 9c show the operational concepts of the fully passive decay heat removal system 100 for sodium-cooled fast reactors, which utilizes the partially immersed heat exchanger.

FIG. 9a shows a normal operating state. As shown therein, the sodium of the cold pool 130 is filled up to ⅓ of the effective heat transfer tube length (L) of the sodium-sodium decay heat exchanger 150, and the sodium of the hot pool 120 is located outside the sodium-sodium decay heat exchanger support barrel 140. Most of the outside of the sodium-sodium decay heat exchanger support barrel 140, which corresponds to the effective heat transfer tube length (L), is surrounded by a pool buffer region, and during normal operation, the sodium of the cold pool 130 continuously locally circulates through the partially perforated shroud 158 of the sodium-sodium decay heat exchanger 150 to the region of the cold pool 130. Particularly, in the present invention, because the sodium of the cold pool 130 occupies a portion of the effective heat transfer tube length (L) of the sodium-sodium decay heat exchanger 150, and preferably a portion corresponding to ⅓ of the effective heat transfer tube length, a given amount of heat is dispersed via the intermediate sodium loop 170 into the atmosphere even during normal operation, and thus a continuous forward flow of sodium is formed in the intermediate sodium loop.

FIG. 9b shows the operating state before the overflow of the hot pool 120 occurs in a transition stage in the event of loss of the normal heat removal function. As shown therein, the heat transfer tubes 154 of the sodium-sodium decay heat exchanger 150, which have been brought into partial contact with the sodium of the cold pool 130 during normal operation, make direct contact with the sodium of the cold pool 130 because the liquid level of sodium has risen simultaneously with the shut down of the primary pump 180. By a heat flux flowing from the inner circumferential surface of the sodium-sodium decay heat exchanger support barrel surrounded by the hot pool 120, sodium filled in the ring-shaped space consisting of the inner circumferential surface of the sodium-sodium decay heat exchanger support barrel 140 and the outer circumferential surface of the sodium-sodium decay heat exchanger shroud 158 is heated. Thus, by the density difference between the heated sodium in the ring-shaped space and the cold sodium in the heat transfer tubes 154 of the sodium-sodium decay heat exchanger, a local sodium flow is formed while heat removal is continuously performed even before the flow overflows to the sodium-sodium decay heat exchanger 150.

FIG. 9c shows the operating state after the overflow of the hot pool 120 occurs in a transition stage in the event of loss of the normal heat removal function. As shown therein, the hot sodium is introduced directly into the sodium-sodium decay heat exchanger 150 by the overflow of the hot sodium resulting from the expansion of the sodium of the hot pool 120, while a regular heat removal function is being performed. The sodium overflow from the hot pool 120 is mixed with a sodium coolant in the support barrel 140 while being introduced into the sodium-sodium decay heat exchanger 150. At this time, a smooth flow path between the hot pool 120 and the cold pool is secured, because the flow guide plate 190 inducing flow to the heat transfer tube inlet 156 of the sodium-sodium decay heat exchanger 150 is provided.

As described above, in the fully passive decay heat removal system according to the prior art, an isolation valve in the intermediate sodium loop or a damper in the air inlet/outlet of the sodium-air heat exchanger was eliminated, thus enhancing the passive property of the system. However, in the case in which the temperature of outdoor air falls below zero or in which the average temperature of sodium in the nuclear reactor pools during the refueling period of a nuclear power plant falls to 200° C., the possibility of solidification of sodium in the intermediate sodium loop for heat removal was increased, thus making it difficult to secure the standby reliability of the safety system.

Contrary to this, the structure of the partially immersed sodium-sodium decay heat exchanger (partially immersed DHX) according to the present invention can fundamentally improve the mechanism of heat transfer to the intermediate sodium loop during normal operation, thus making possible the guarantee that a sufficient amount of heat transfer required for the prevention of solidification of sodium takes place. Accordingly, it can reduce the possibility of solidification of sodium in the intermediate sodium loop for heat removal over the entire operating period of a nuclear power plant to minimize the possibility of the functional loss of the heat removal loop resulting from sodium solidification, thus significantly improving the standby reliability of the safety system.

In addition, according to the present invention, the design associated with the arrangement of the sodium-sodium decay heat exchanger is improved in order to prevent the local overcooling of sodium in the cold pool region from occurring due to the adoption of the partially immersed sodium-sodium decay heat exchanger. Particularly, by optimizing a flow path configuration in connection with the formation of circulating flow in the sodium coolant pool of a nuclear reactor in a transition state, stable heat removal performance can be secured not only in a normal operating state, but also in a transition stage.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fully passive decay heat removal system comprising: a hot pool having received therein hot sodium heated by a nuclear reactor core; an intermediate heat exchanger which heat-exchanges with the sodium of the hot pool; a cold pool having received therein cold sodium cooled by passage through the intermediate heat exchanger, the cold pool being isolated from the hot pool; a support barrel extending vertically through the boundary between the hot pool and the cold pool, in which the upper end of the support barrel is higher than the liquid level of the hot pool, and the lower end thereof penetrates into the cold pool; a sodium-sodium decay heat exchanger having a heat transfer tube, the sodium-sodium decay heat exchanger being received in the support barrel in order to remove decay heat from the inside of the nuclear reactor; a sodium-air heat exchanger which is provided at a position higher than the sodium-sodium decay heat exchanger; an intermediate sodium loop for heat removal which connects the sodium-sodium decay heat exchanger with the sodium-air heat exchanger; and a primary pump which pumps the sodium of the cold pool to the hot pool via the nuclear reactor core in a normal operating state to maintain a difference in liquid level between the hot pool and the cold pool, such that the liquid level of the hot pool is higher than that of the cold pool, wherein a portion of an effective heat transfer tube of the heat transfer tube is immersed in the cold pool in a normal operating state, and a surface of a lower end of a shroud for the sodium-sodium decay heat exchanger, the lower end being immersed in the sodium of the cold pool, has perforated holes.

2. The fully passive decay heat removal system of claim 1, wherein a length of the effective heat transfer tube of the sodium-sodium decay heat exchanger is immersed in the cold pool and is ⅓ of the total length of the effective heat transfer tube.

3. The fully passive decay heat removal system of claim 1, wherein the shroud of the sodium-sodium decay heat exchanger is formed so as to extend beyond a lower end of the sodium-sodium decay heat exchanger, and the extended portion of the shroud is formed in a baffle form.

4. The fully passive decay heat removal system of claim 3, wherein the lower end of the shroud formed so as to extend beyond the lower end of the sodium-sodium decay heat exchanger is located at a middle portion of a reactor separation plate in the region of the cold pool.

5. The fully passive decay heat removal system of claim 1, wherein a heat transfer tube distributor connects a sodium flow downcomer of the sodium-sodium decay heat exchanger with the heat transfer tube and is formed of a tube sheet of the same outer diameter as that of the sodium flow downcomer.

6. The fully passive decay heat removal system of claim 1, wherein the sodium of the hot pool overflows the support barrel upon loss of the normal heat removal function and a flow guide plate is provided immediately below a heat transfer tube inlet formed above the shroud of the sodium-sodium decay heat exchanger.

7. The fully passive decay heat removal system of claim 6, wherein the flow guide plate is provided in a space through which the sodium of the cold pool, which flows upward in the support barrel upon loss of the normal removal function, can pass and which is formed between the support barrel and the shroud.

8. The fully passive decay heat removal system of claim 7, wherein the flow guide plate is a perforated ring plate which is inserted into a ring-shaped space formed between the support barrel and the shroud.

9. A fully passive decay heat removal system comprising: a hot pool having received therein hot sodium heated by a nuclear reactor core; an intermediate heat exchanger which heat-exchanges with the sodium of the hot pool; a cold pool having received therein cold sodium cooled by passage through the intermediate heat exchanger, the cold pool being isolated from the hot pool; a support barrel extending vertically through the boundary between the hot pool and the cold pool, in which the upper end of the support barrel is higher than the liquid level of the hot pool, and the lower end thereof penetrates into the cold pool; a sodium-sodium decay heat exchanger having a heat transfer tube, the sodium-sodium decay heat exchanger being received in the support barrel in order to remove decay heat from inside of the nuclear reactor; a sodium-air heat exchanger which is provided at a position higher than the sodium-sodium decay heat exchanger; an intermediate sodium loop for heat removal which connects the sodium-sodium decay heat exchanger with the sodium-air heat exchanger; and a primary pump which pumps the sodium of the cold pool to the hot pool via the nuclear reactor core in a normal operating state to maintain a difference in liquid level between the hot pool and the cold pool, such that the liquid level of the hot pool is higher than that of the cold pool, wherein a portion of an effective heat transfer tube of the heat transfer tube is immersed in the cold pool in a normal operating state, the sodium of the hot pool overflows the support barrel upon loss of the normal heat removal function and a flow guide plate is provided immediately below a heat transfer tube inlet formed above a shroud of the sodium-sodium decay heat exchanger.

10. The fully passive decay heat removal system of claim 9, wherein the flow guide plate is provided in a space through which the sodium of the cold pool, which flows upward in the support barrel upon loss of the normal removal function, can pass and which is formed between the support barrel and the shroud.

11. The fully passive decay heat removal system of claim 10, wherein the flow guide plate is a perforated ring plate which is inserted into a ring-shaped space formed between the support barrel and the shroud.

* * * * *